United States Patent [19]

Lescovich et al.

[11] Patent Number: 5,370,791
[45] Date of Patent: * Dec. 6, 1994

[54] BACKWASHABLE SELF-CLEANING STRAINER

[75] Inventors: Joseph E. Lescovich, Pittsburgh; Warren L. Huggins, Gibsonia, both of Pa.

[73] Assignee: G A Industries, Inc., Mars, Pa.

[ * ] Notice: The portion of the term of this patent subsequent to Feb. 2, 2010 has been disclaimed.

[21] Appl. No.: 900,190

[22] Filed: Jun. 17, 1992

Related U.S. Application Data

[63] Continuation-in-part of Ser. No. 748,659, Aug. 22, 1991, Pat. No. 5,183,568.

[51] Int. Cl.$^5$ ................... B01D 33/067; B01D 33/11
[52] U.S. Cl. ........................... 210/107; 210/108; 210/111; 210/138; 210/360.1; 210/373; 210/374; 210/375; 210/392; 210/393; 210/396; 210/403; 210/380.1; 494/36; 209/303; 209/304
[58] Field of Search ............... 210/373, 374, 392, 393, 210/375, 394, 396, 380.1, 360.1, 403, 108, 111, 107, 138; 209/390, 380, 303, 304; 494/36

[56] References Cited

U.S. PATENT DOCUMENTS 2,275,958  3/1942  Hagel .
4,315,820  2/1982  Mann .
5,183,568  2/1993  Lescovich .

FOREIGN PATENT DOCUMENTS 3-106  1/1991  Japan .

Primary Examiner—Thomas M. Lithgow
Attorney, Agent, or Firm—Armstrong, Westerman, Hattori, McLeland & Naughton

[57] ABSTRACT

A backwashable self-cleaning strainer has a vertical housing containing a rotatable strainer basket. The housing has an inlet adjacent the top thereof and an outlet adjacent the bottom wall, with a flush discharge opening in the bottom wall. Components for rotating the strainer basket are located outside the flow of water containing particulates that enters the housing. A hollow backwash conduit with a passage through the sidewall is positioned adjacent the inner surface of the strainer basket and communicates with a sealable aperture in the wall of the housing. Upon opening of the aperture, cleaned water flows through the side wall of the strainer basket, removing particulates therefrom, and out the hollow backwash conduit. An intermittently rotatable brush is also provided to brush the inner surface of the strainer basket.

9 Claims, 3 Drawing Sheets

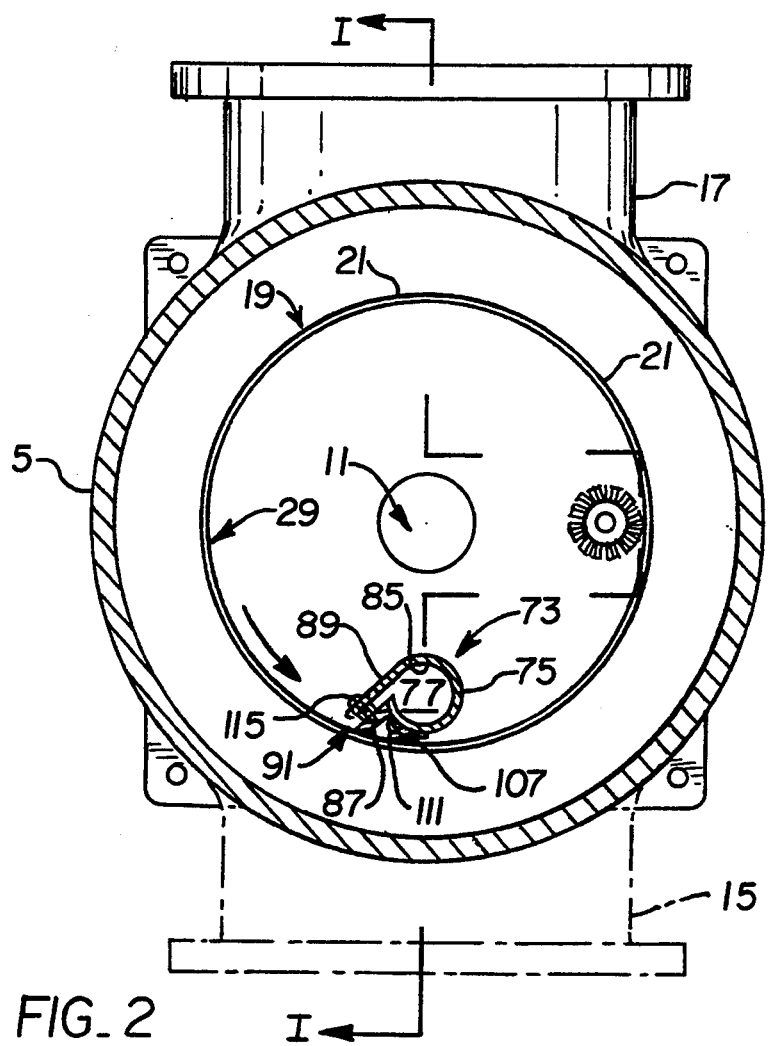
FIG_2
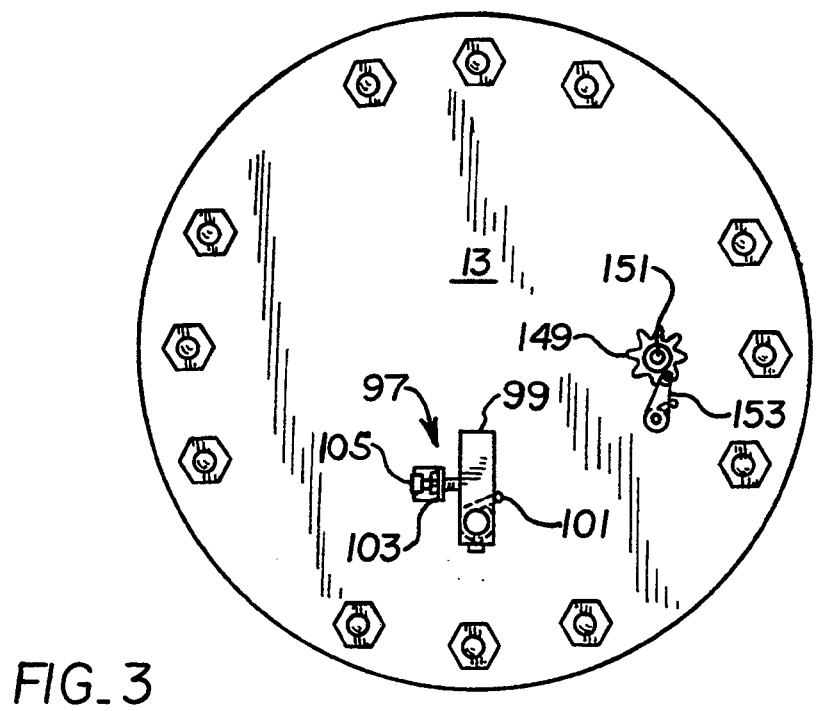
FIG_3

BACKWASHABLE SELF-CLEANING STRAINER

CROSS-REFERENCE TO RELATED APPLICATION

This application is a continuation-in-part of application Ser. No. 748,659 filed Aug. 22, 1991, now U.S. Pat. No. 5,183,568 in the name of Joseph E. Lescovich, one of the inventors herein, entitled "Self-Cleaning Strainer," and assigned to the assignee of the present application, the contents of said application incorporated by reference herein.

FIELD OF THE INVENTION

The present invention relates to a backwashable strainer apparatus and more particularly to a self-cleaning backwashable strainer used to remove particulates from water that is to be used in industrial installations.

BACKGROUND OF THE INVENTION

In many industrial installations, a large supply of water is often needed for cooling, flushing, or other applications. Such a large supply of water is usually taken from a body of water, such as a river, stream, pond or other water source, which contains particulate material, such as leaves, twigs, stones and the like, that would be harmful to industrial equipment and which particulate material must be removed. In order to remove such particulates, an initial bar screen may be used to filter out the largest articles, while other particulates are fed to a straining apparatus which may be a rotary strainer containing a rotary basket screen or other device to remove particulates.

The assignee of the present invention has, for example, provided strainers which are adapted for service on a suction side of pumps to strain liquid of foreign matter, and one such device is of a motorized self-cleaning type that contains a strainer basket in a housing, which basket is motor driven. A support with spokes suspends the strainer basket in the housing, while a brush, shear knife and/or water jet device is used to clean the strainer basket sidewall. A revolving brush on the outside of the strainer basket keeps the strainer basket openings free from clogging, while a shear knife on the outside of the strainer basket shears any protruding matter from the basket as it revolves, and high pressure cleaning jets pressure clean the strainer basket as it revolves, forcing debris from the strainer basket and its openings. While this type of device is eminently suited for most applications, the support and spokes are positioned in the flow of water containing particulates and collection of debris thereon or wearing of the same by contact with the particulate-containing water would best be avoided.

In co-pending application Ser. No. 748,659, now U.S. Pat. No. 5,183,568 of which this application is a continuation-in-part, a self-cleaning strainer is described having a vertically disposed housing which contains a rotatable strainer basket. The housing has an open top, closed by a closure plate, an inlet adjacent the top of the housing and an outlet adjacent a closed bottom of the housing, the closed bottom having a flush discharge opening. The components used to rotate the strainer basket are disposed outside the flow of any water containing particulates that enters the housing. Cleaning devices, such as a scraper blade supported in the strainer basket, a rotatable brush supported in the strainer basket, and a water jet manifold disposed between the housing sidewall and the sidewall of the strainer basket are used to clean the rotatable strainer basket.

It is an object of the present invention to provide a self-cleaning strainer where the apparatus used to rotate the strainer basket is positioned out of the flow of liquid containing particulates that is fed to the strainer basket.

It is another object of the present invention to provide cleaning devices for the wall of the strainer that better act to clean the openings and inner surface of the wall of the strainer basket.

It is yet another object of the present invention to provide a self-cleaning strainer having a combination scraper-backwash unit that enables adjustable backwashing of the inner surface of the wall of the strainer basket without the use of water-jet sprays.

It is a further object of the present invention to provide for intermittent rotation of a brush that is adapted to clean the inner surface of the wall of the strainer basket.

SUMMARY OF THE INVENTION

A self-cleaning strainer has a vertically disposed housing with a sidewall, open top and bottom wall, the top sealed by a closure plate. An inlet is provided in the housing sidewall adjacent the top while an outlet is provided adjacent the bottom, preferably opposite the inlet, and a flush discharge opening is formed in the bottom wall. Disposed in the housing is a rotatable strainer basket that has an open top and bottom and a foraminous side wall, the basket spaced from the sidewall of the housing and below the inlet, such that liquid, with particulates, enters the housing and passes into the strainer basket, and particulates are collected on the inner surface of the basket sidewall while clean liquid passes through openings in the sidewall and is discharged from the housing through the outlet. A means for rotating the strainer basket is provided in the housing and is positioned out of the flow of the liquid containing particulates, preferably in spacing between the strainer basket and the housing sidewall.

A cleaning device is provided for cleaning the inner surface of the cylindrical side wall of the strainer basket, to remove particulates collected thereon, the cleaning device including a hollow backwash conduit having an outer wall that defines a chamber. The hollow backwash conduit is disposed in the confines of the rotatable strainer basket adjacent the inner surface of the basket and has a passage through the wall facing the inner surface of the strainer basket. The passage preferably extends the length of the conduit. An aperture is provided in the wall of the housing, which aperture communicates with the chamber of the hollow backwash conduit, and a sealing device is arranged so as to open or close the aperture and chamber of the hollow backwash conduit to the area outside the strainer housing.

A scraper blade is provided on the hollow backwash conduit, on one side of the passage through the wall thereof, and an extension member is provided on the other side of the passage, both of which extend toward the inner surface of the strainer basket and are spaced apart to form a channel therebetween which communicates through the passage with the chamber in the hollow backwash conduit. At least one of said scraper blade and extension member are adjustable so as to enable adjustment of the width of the channel formed therebetween, and the force of contact of the scraper blade against the inside of the strainer basket wall is also adjustable.

A rotatable brush is also provided in the strainer basket, with the brush located adjacent and beyond the scraper blade, in the direction of rotation of the strainer basket, the rotatable brush preferably rotatable in a direction opposite the rotation of the strainer basket. Preferably, the rotatable brush is adapted to intermittently rotate, such as a partial rotation of about 45° for each complete rotation of the strainer basket, so as to reduce wear thereof.

BRIEF DESCRIPTION OF THE DRAWINGS

The invention will become more readily apparent from the following description of a preferred embodiment thereof shown, by way of example only, in the accompanying drawings, wherein:

FIG. 2 is a horizontal cross-sectional view of the backwashable self-cleaning strainer of FIG. 1;

FIG. 3 is a top plan view of the backwashable self-cleaning strainer with the motor removed;

DETAILED DESCRIPTION

Figure 1:
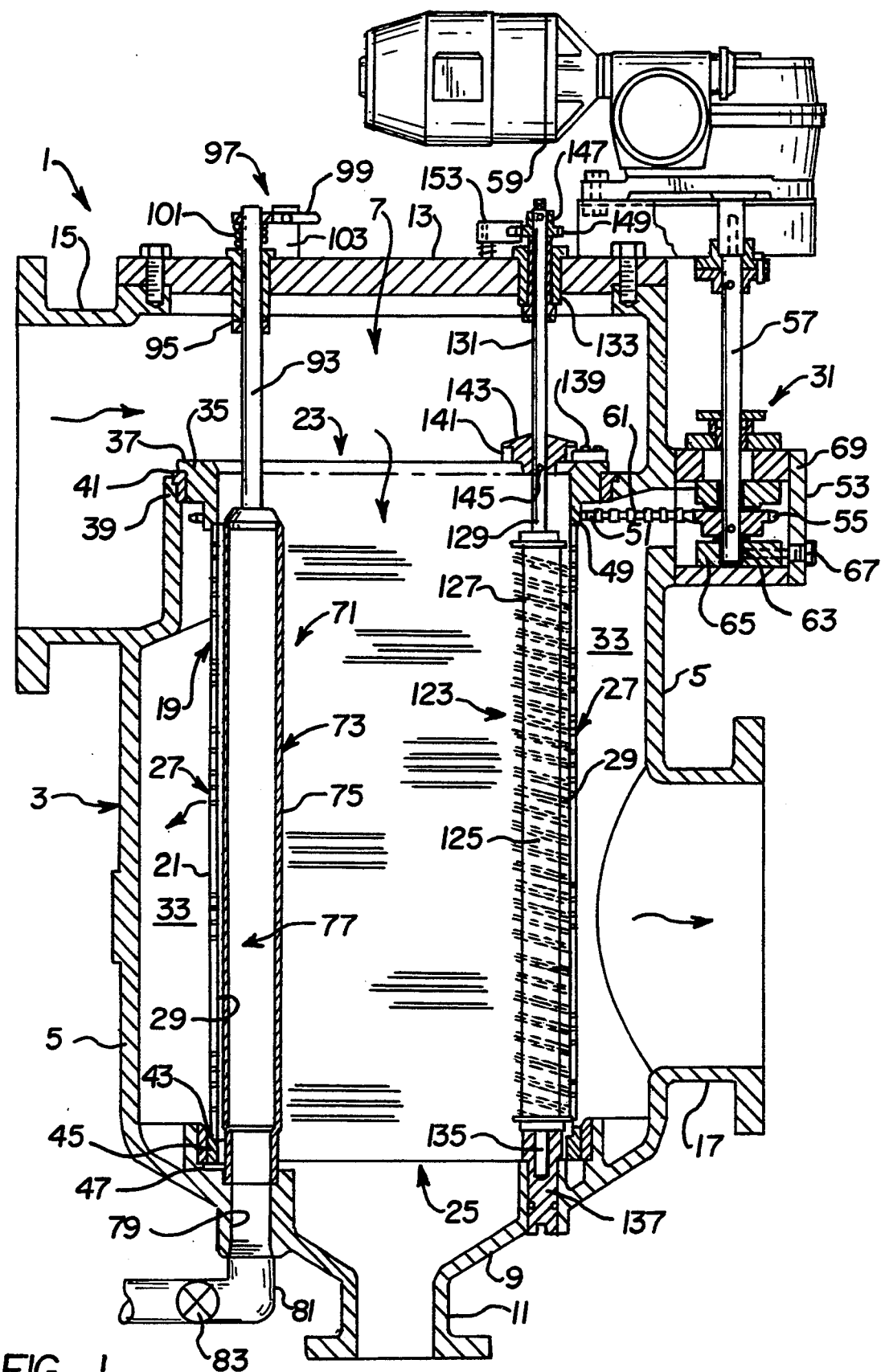
FIG. 1 is a partial cross-sectional elevational view of the backwashable self-cleaning strainer of the present invention.

Referring now to FIG. 1, a self-cleaning strainer 1 of the present invention is illustrated, having a vertically disposed housing 3 which has an upstanding side wall 5, an open top 7 and a bottom wall 9. A flush discharge opening 11 is provided in the bottom wall 9 which is attachable to a discharge valve (not shown), such as a shear gate valve. A cover plate 13 sealingly closes the open top 7 of the housing 3. An inlet 15 is provided in the side wall 5 for charging to the housing of a liquid containing particulates, the inlet 15 positioned adjacent the open top 7 of the housing 3. An outlet 17 is also provided in the side wall 5 adjacent the bottom wall 9 for discharge from the housing 3 of clear liquid after particulates have been removed therefrom. Disposed in the housing 3 is a rotatable strainer basket 19 which has a cylindrical foraminous side wall 21, an open top 23 and an open bottom 25. The cylindrical foraminous side wall 21 has openings 27 therethrough such that liquid may pass through the side wall while particulates will be removed from the liquid and collected on the inner surface 29 of the foraminous side wall 21. The side wall 21 of the strainer basket may be formed from a mesh-like material, a perforated sheet material, a series of spaced bars, as illustrated, or other material forming a foraminous side wall for the basket.

A means 31 is provided for rotating the strainer basket 19, which means 31 is positioned out of the flow of liquid containing particulates, such as in a spacing 33 between the upstanding sidewall 5 of the housing 3 and the cylindrical foraminous sidewall 21 of the strainer basket 19. As illustrated, the strainer basket 19 preferably has an upper portion 35 that has a shoulder 37 which extends outwardly therefrom, while an inwardly directed flange 39 is provided on the upstanding sidewall 5 of the housing 3, with the shoulder 37 and flange 39 rotatably sealingly engaged through an upper bearing 41. The strainer basket 19 also has a lower portion 43 which is rotatably sealingly engaged through a lower bearing 45 with an upwardly extending flange 47 on the bottom wall 9 of the housing 3. In order to ensure that no restriction to flow of the liquid through the self-cleaning strainer occurs, the area of the spacing 33 between the upstanding side wall 5 of the housing and the cylindrical foraminous side wall 21 of the strainer basket 19 is greater than the cross-sectional area of the opening of the inlet 15.

The upper portion 35 of the strainer basket 21 has a lip 49 extending downwardly therefrom, which lip 49 has outwardly extending sprockets 51. A drive housing 53 is carried by the housing 3, which contains a sprocket wheel 55 connected to a motor shaft 57, the motor shaft in turn connected to a motor 59 for rotation of the shaft 57 and sprocket wheel 55. A chain 61 engages with the sprocket wheel 55 and the sprockets 51 on the downwardly extending lip 49 of the upper portion 35 of the strainer basket 19.

The shaft 57 is mounted in a bearing 63 disposed in a slidable block 65 and adjusting screw 67 may be threaded through an end wall 69 of the drive housing 53 so as to loosen or tighten the contact of the chain 61 with the sprockets 51.

In operation of the self-cleaning strainer 1, water containing particulates is charged to the housing 3 through inlet 15 and flows, as shown by the arrows in FIG. 1, downwardly through the open top 23 of the strainer basket 19. The water is then directed through the openings 27 in the sidewall 21 of the strainer basket and clean water is discharged from the housing 3 through outlet 17. Particulates removed from the water are collected on the inner surface 29 of the sidewall 21 of the strainer basket 19. The inner surface 29 of the sidewall 21 of the strainer basket 19 must be periodically cleaned and a means 71 for cleaning the inner surface 29 is provided.

The means 71 for cleaning the inner wall 29 of the strainer basket 19 comprises a hollow backwash conduit 73 having an outer wall 75 which defines a chamber 77, the hollow backwash conduit 73 disposed in the rotatable strainer basket 19 adjacent the inner surface 29 thereof. An aperture 79 is formed in the wall of the housing 3, such as through bottom wall 9, with the hollow backwash conduit 73 resting on bottom wall 9, and with the aperture 79 in communication with the chamber 77. The aperture is sealed, such as by a threaded pipe 81 threadedly engaged with the bottom wall 9 of the housing 3, which pipe 81 contains a shut-off valve 83. The hollow backwash conduit 73 preferably extends the entire length of the strainer basket 19. A passage 85 is formed through the outer wall 75 of the hollow backwash conduit 73 and preferably faces the inner surface 29 of the strainer basket 19 and preferably extends substantially the length of said hollow backwash conduit 73 within the strainer basket 19.

During operation of the strainer 1, water containing particulates passes from inlet 15 through the open top 23 of the strainer basket 19 into the confines of the strainer basket 19, with the water flowing through the foraminous side wall 21 through openings 27 and into the chamber 33 between the strainer basket 19 and the side wall 5 of the housing 3 before discharge through the outlet 17 for use. The particulate material in the water entering the strainer is collected on the inner surface 29 of the strainer basket 19 and must be periodically removed. The pressure within the confines of the strainer basket 19 and in the spacing 33 between the strainer basket 19 and the wall 5 of the housing 3 is increased due to forcing of the water therethrough. Upon opening the valve 83, to open flow through aperture 79, to the outside atmosphere, and rotation of a strainer basket 19, a reduced pressure is formed in the chamber 77 of the hollow backwash conduit 73 relative to the spacing 33 between the strainer basket 19 and the wall 5 of housing 3, which forces clean water from the spacing 33 back through the foraminous side wall 21 of the strainer basket 19 in a flow pattern opposite that of normal operational flow. By such reversal of the flow pattern, particulate material collected on the inner surface 29 of the strainer basket is removed and carried by water through the passage 85, into chamber 77 of the hollow backwash conduit 73 and out of the aperture 79 for discharge from the strainer 1, or it may be directed into the bottom section of the housing 3 from which it is subsequently discharged. The rate of flow and amount of backwash water from the strainer may be controlled by adjusting the valve 83 so as to control flow of water from the chamber 77 through pipe 81.

Figure 4:
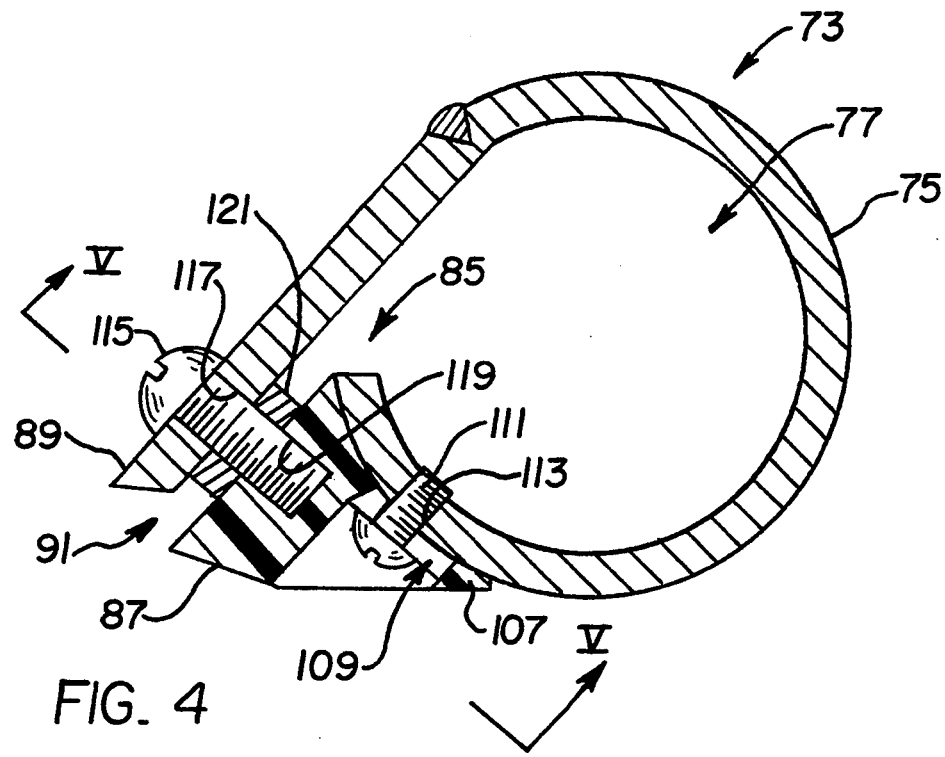
FIG. 4 is a horizontal cross-sectional view of an embodiment of the hollow backwash conduit, scraper blade and extension member of the backwashable self-cleaning strainer of the present invention.
Figure 5:
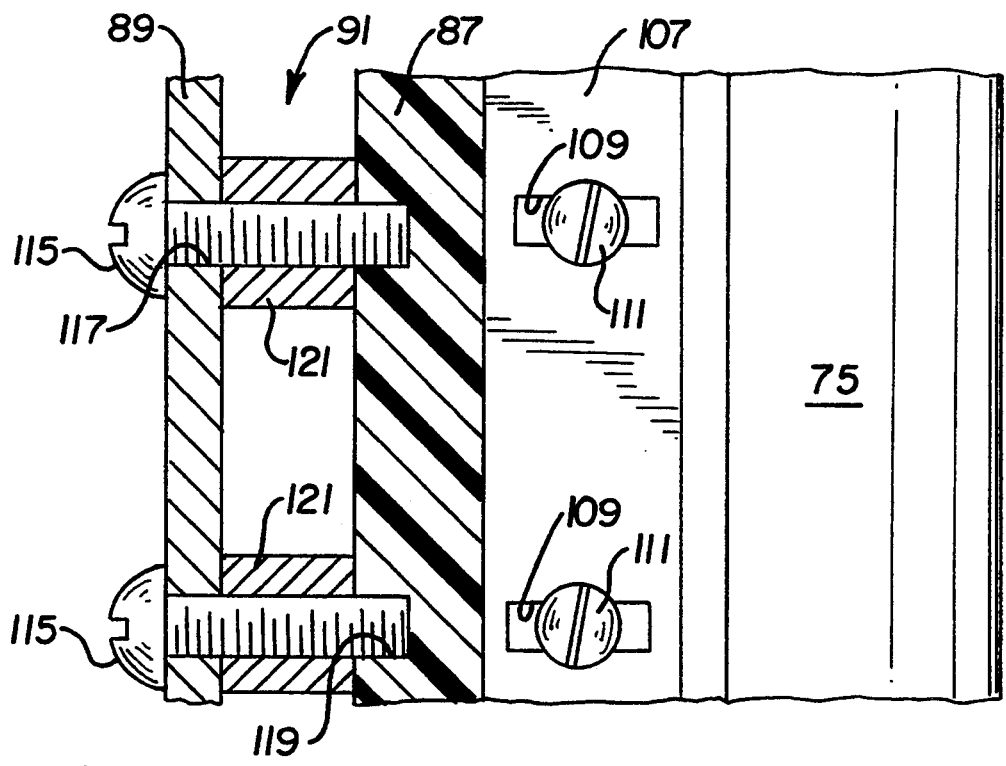
FIG. 5 is an elevational view, partly in cross-section, of a portion of the hollow backwash conduit, scraper blade and extension member of the backwashable self-cleaning strainer of the present invention.

In order to assist in removal of particulate material from the inner surface 29 of the strainer basket 19, a shear member or scraper blade 87 is provided on the hollow backwash conduit 73 on one side of the passage 85, which is positioned to contact the inner surface 29 and scrape particulate material therefrom. The scraper blade 87 is preferably formed from a high-wear, low friction type material, such as an ultra-high molecular weight polymeric material. An extension member 89, such as a plate, is provided on the other side of the passage 85, which extends towards the inner surface 29, at a position spaced from the scraper blade 87, in the direction opposite the direction of rotation of the strainer basket 19 (indicated by the arrow in FIG. 2), so as to form a channel 91 therebetween, which channel 91 communicates through the passage 85 with the chamber 77 in the hollow backwash conduit 73. The hollow backwash conduit has a shaft 93 extending upwardly therefrom, which shaft passes through a bushing 95 in the cover 13, and a means 97 for adjusting the tension of the scraper blade 87 against the inner surface 29 is provided, shown as an adjustment bar 99 and a coil spring 101 attached to the shaft 93 and adjustment bar 99. An adjustment screw 105 may be provided on support post 103 to contact the adjustment bar 99 and control the pressure of contact of the scraper blade 87 on the inner surface 29 of the strainer basket 19. The scraper blade 87 preferably extends outwardly from a base 107 thereof (FIG. 4) which is flush with the wall 75 of the hollow backwash conduit 73. In order to provide further adjustability for the scraper blade 87 relative to the surface 29, and adjustability relative to the extension member 89, a series of vertically spaced lateral slots 109 (FIG. 5) are provided in the base 107, through which bolts 111 are passed and secured in threaded bores 113 in the wall 75. Loosening and tightening of the bolts 111 enable movement and securement of the scraper blade 87 laterally. The size of the channel 91, and thus the volume of flow of backwash water therethrough to the chamber 77 is also adjustable by adjustable securement of the scraper blade 87 to the extension member 89. As illustrated, spaced threaded bolts 115 may be provided which pass through apertures 117 in the extension member 89 and are threadedly engaged in threaded bores 119 in the scraper blade 87. Spacers 121, such as washers about bolts 115, are used to stabilize the extension member 89 relative to the scraper blade 87 and the number and size of spacers 121 controls the width of the channel 91.

In order to further clean the inner surface 29 of the strainer basket 19, a rotatable brush 123 may be provided, supported in the strainer basket 19 and positioned to contact the inner surface 29. The rotatable brush 123 has a bristled portion 125, having bristles 127, carried by a brush shaft 129, the upper portion 131 of shaft 129 passing through an upper bushing 133 in the cover 13 on housing 3, while the lower portion 135 of shaft 129 is supported in a lower bushing 137 in the bottom wall 9 of the housing 3. The brush 123 may be rotated continuously in a direction opposite the direction of rotation of the strainer basket 19 through connection (not shown) with the shaft 57 of motor 59, but the rotatable brush 123 is preferably intermittently rotatable. In order to effect intermittent rotation of the brush 123, a cam 139 is attached to the upper portion 35 of the strainer basket 19 which will contact a flange 141 on a brush index member 143 that is fixed to the shaft 129 of the brush 123, such as by pin 145. The flange 141 is sized such that the brush 123 will be rotated about 45° each time that the strainer basket completes a 360° rotation. This assures that a clean surface of bristles 127 is provided for contact with the inner surface 29 of the wall 21 of strainer basket 19 and reduces wear on the bristles 127 as compared with continuous rotation of the brush 123. A brush ratchet 147 is preferably also provided on the shaft 129, such as a star wheel 149 adjacent the upper terminus 151 of the shaft 129, which engages with a spring loaded cleat 153. The star wheel 149 and spring loaded cleat 153 assure that the cam 139 is correctly aligned with the brush index member 135.

During operation of the strainer 1, as hereinbefore described, particulate material collects on the inner surface 29 of the strainer basket 19. To aid in removal of the particulate material, in addition to the scraper blade 87 and back flow through the hollow backwash conduit 73, the bristled brush 123 contacts the inner surface 29 and shears and brushes particulate material therefrom which flows by gravity to the flush discharge opening 11. The brush 123 is intermittently partially rotated, about 45° for each complete rotation of the basket to provide a clean brush surface for contact with the inner surface 29 of the foraminous side wall 21 of the strainer basket 19. Particulate material which falls through the open bottom 25 of the strainer basket 19 is discharged through the flush discharge opening 11. The flush discharge opening 11 may be open to an off-take continuously or a shear gate valve may be used to close the same when desired. If more flushing of the strainer basket and flush discharge opening 11 is desired, flush water may be charged through a flush water conduit (not shown) downwardly through the strainer basket 19. When the strainer basket 19 has been cleaned, the motor 59 is shut down and the rotation of the strainer basket 19 and rotatable brush 123 terminated, and the valve 83 closed to seal the hollow backwash conduit 73. The self cleaning strainer may then be used to clean further particulate-laden water.

A cleaning operation may also be effected without interruption of service of the strainer by simply opening a shear gate valve attached to the flush discharge opening 11.

Also, the strainer may be cleaned by temporarily taking the strainer out of service by closing a valve in a conduit leading to inlet 15, as well as a valve in a conduit leading from outlet 17 and then opening a shear gate valve attached to the flush discharge opening 11. Flush water is then charged downwardly through the strainer basket 19 which will flush out debris through the flush discharge opening 11.

The cleaning of the strainer can be effected, as above-described, by use of a pressure drop activated device, by a time activated device to periodically flush out the strainer, or by a device responding to any other preferred electrical or other signal.

A control panel may be provided that cooperates with the strainer and can be programmed for any type of flushing and in response to any desired signal, so that the user has great flexibility with respect to flushing procedures and the reason for a flushing cycle. Also, the allowable time for flushing can be pre-established and programmed into a control panel. Such a programmer is not necessary to any of the above cleaning procedures, since a user may tie it into the user's own system or effect such a cleaning procedure manually or semi-automatically. Use of such a control panel, however, allows for programming and automatic cleaning to suit a particular installation.

What is claimed is:

1. A self-cleaning strainer comprising:
   a vertically disposed housing having an upstanding side wall, an open top and a bottom wall;
   said housing having an inlet in the side wall for a liquid containing particulates, adjacent said open top, an outlet in the side wall adjacent said bottom wall for clean liquid, and a flush discharge opening in said bottom wall;
   a cover plate sealingly closing the open top of said housing;
   a rotatably mounted strainer basket, having a cylindrical foraminous side wall with an inner surface and an open top and bottom, with openings through said cylindrical side wall for flow of liquid therethrough, disposed in said housing, spaced from said side wall of said housing and disposed below said inlet, such that liquid containing particulates entering said inlet passes into said strainer basket and outwardly through said openings to remove said particulates, and clean liquid is directed through said outlet;
   means for rotating said strainer basket in said housing, said means for rotating being positioned out of the flow of liquid containing particulates; and
   means for cleaning the inner surface of the cylindrical side wall of said strainer basket to remove particulates which are collected thereon, said means for cleaning including a hollow backwash conduit having an outer wall defining a chamber, disposed in said rotatably mounted strainer basket adjacent said inner surface thereof, said hollow backwash conduit having a passage through the outer wall thereof facing said inner surface, wherein said passage is an elongated passage having two sides, and said strainer includes a scraper blade on one side of the elongated passage on said hollow backwash conduit, positioned to contact said inner surface and an extension member on the other side of the passage on said backwash conduit extending towards said inner surface, said scraper blade and extension member spaced from each other to form a channel therebetween communicating through said passage with the chamber of said hollow backwash conduit, means for adjustably securing said scraper blade to the backwash conduit for adjustment of the width of the passage between the blade and the extension member;
   an aperture in a wall of said housing communicating with said chamber of said hollow backwash conduit; and
   means to seal said aperture in said wall of said housing.

2. The self-cleaning strainer as defined in claim 1 wherein said passage through the outer wall of said hollow backwash conduit extends substantially the length of said conduit within said rotatably mounted strainer basket.

3. The self-cleaning strainer as defined in claim 1 wherein said scraper blade has a base and means are provided to laterally adjustably secure said base to said hollow backwash conduit.

4. The self-cleaning strainer as defined in claim 1 wherein spacers are provided between said scraper blade and said extension member to stabilize the same in spaced relationship.

5. The self-cleaning strainer as defined in claim 1, including means for varying the pressure of contact of said scraper blade on said inner surface.

6. The self-cleaning strainer as defined in claim 1 including means for regulating the volume of flow of said backwash water through said hollow backwash conduit.

7. The self-cleaning strainer as defined in claim 1 including a rotatably mounted bristled brush, positioned such that the bristles on the brush contact said inner surface, supported in said strainer basket in said housing.

8. The self-cleaning strainer as defined in claim 7 including means for intermittently rotating said rotatably mounted bristled brush.

9. The self-cleaning strainer as defined in claim 7, wherein said rotatably mounted bristled brush is mounted eccentrically in said housing.

* * * * *